US010753068B1

(12) United States Patent
Ferraz, Jr. et al.

(10) Patent No.: US 10,753,068 B1
(45) Date of Patent: Aug. 25, 2020

(54) ELECTRO-HYDRAULIC ARRANGEMENT FOR AN EARTHMOVING MACHINE

(71) Applicant: Caterpillar Inc., Deerfield, IL (US)

(72) Inventors: John Ferraz, Jr., Romeoville, IL (US); Michael Thomas Jackson, Hanna City, IL (US); Kenneth Alan Dust, Downers Grove, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 16/294,049

(22) Filed: Mar. 6, 2019

(51) Int. Cl.
F15B 21/14 (2006.01)
E02F 9/22 (2006.01)
F15B 11/16 (2006.01)
F16K 11/07 (2006.01)
E02F 3/76 (2006.01)

(52) U.S. Cl.
CPC .......... *E02F 9/2203* (2013.01); *E02F 3/7618* (2013.01); *E02F 9/2217* (2013.01); *E02F 9/2225* (2013.01); *E02F 9/2267* (2013.01); *E02F 9/2271* (2013.01); *E02F 9/2285* (2013.01); *F15B 11/16* (2013.01); *F15B 21/14* (2013.01); *F16K 11/07* (2013.01); *F15B 2211/30525* (2013.01); *F15B 2211/327* (2013.01); *F15B 2211/71* (2013.01)

(58) Field of Classification Search
CPC ...... F15B 21/14; F15B 11/16; F15B 2211/71; F15B 11/024; E02F 9/2217; E02F 3/844
See application file for complete search history.

(56) References Cited

U.S. PATENT DOCUMENTS

| 3,705,631 | A | * | 12/1972 | Seaberg ............... E02F 3/844 172/812 |
| 5,682,955 | A | * | 11/1997 | Groth ................. E02F 3/844 172/811 |
| 6,273,198 | B1 | * | 8/2001 | Bauer ................. E02F 3/7613 172/825 |
| 6,502,393 | B1 | | 1/2003 | Stephenson et al. |
| 8,875,736 | B2 | | 11/2014 | Jeon |
| 8,944,103 | B2 | | 2/2015 | Opdenbosch et al. |
| 2017/0145660 | A1 | | 5/2017 | O'Neill at al. |
| 2017/0276155 | A1 | | 9/2017 | Hijikata et al. |
| 2017/0363116 | A1 | | 12/2017 | Huang et al. |

FOREIGN PATENT DOCUMENTS

| CN | 201401383 | 2/2010 |
| WO | 2018098138 | 5/2018 |

* cited by examiner

Primary Examiner — Thomas E Lazo

(57) ABSTRACT

An electro-hydraulic arrangement for controlling operation of a pair of tilt actuators of an earthmoving machine includes a housing, and a directional control valve (DCV) and a regeneration valve (RV) disposed within the housing. The DCV and the RV are coupled in selective fluid communication with one another and with rod end and head end chambers of the actuators via ports defined on the housing. When the DCV is in a first or second operative position, the RV may be positioned in a regenerative position to allow the rod end chambers of respective ones of the first and second actuators to communicate fluid to the head end chamber of the second actuator. Optionally, the regeneration valve may be positioned in a drain position to allow the rod end chambers of respective ones of the first and second actuators to communicate fluid with a drain port of the housing.

20 Claims, 5 Drawing Sheets

ELECTRO-HYDRAULIC ARRANGEMENT FOR AN EARTHMOVING MACHINE

TECHNICAL FIELD

The present disclosure relates to a fluid control system for controlling movement of a work implement associated with an earthmoving machine. More particularly, the present disclosure relates to an electro-hydraulic arrangement for controlling operation of a pair of hydraulic tilt actuators that are associated with a work implement of an earthmoving machine.

BACKGROUND

Earthmoving machines typically employ hydraulic actuators for actuating movement of a work implement. One example of such an earthmoving machine may include a dozer having a dozing blade as the working implement. Such machines may employ a pair of hydraulic tilt cylinders and a hydraulic, or electro-hydraulic, control system for controlling movement of the work implement in relation to a frame of the machine. An example of such a control system is disclosed in U.S. Pat. No. 5,682,955.

However, system hardware design of conventional control systems that control movement of a work implement may be bulky in construction and complex to operate owing, at least in part, to a number of valves and/or a number of manifolds that may be used to form the control system and controlled in operation. Consequently, it is envisioned that costs associated with the manufacture of such control systems may increase with an increased number and complexity of components.

Hence, there is a need for a fluid control system that overcomes the aforementioned drawbacks.

SUMMARY OF THE DISCLOSURE

In an aspect of the present disclosure, an electro-hydraulic arrangement is provided for controlling operation of a pair of hydraulic tilt actuators that are associated with a work implement of an earthmoving machine. The electro-hydraulic arrangement includes a housing, a directional control valve and a regeneration valve that are disposed within the housing. The directional control valve and the regeneration valve are coupled in selective fluid communication with one another. The directional control valve and the regeneration valve are also coupled in selective fluid communication with the pair of actuators via a plurality of ports defined on the housing. At least one first port of the housing communicates fluid between a head end chamber of a first actuator and a first control port of the directional control valve. At least one second port of the housing communicates fluid between a rod end chamber of the first actuator and a second control port of the directional control valve. A third port of the housing communicates fluid between a rod end chamber of a second actuator and a third control port of the directional control valve. A fourth port of the housing communicates fluid between a head end chamber of the second actuator and an output port of the regeneration valve. A drain port of the housing fluidly communicates with a drain control port of the regeneration valve. When the directional control valve is in one of a first and second operative position, the rod end chambers of respective ones of the first and second actuators are configured to communicate fluid with the fourth port to supply fluid to the head end chamber of the second actuator if the regeneration valve is in a regenerative position. Further, when the directional control valve is in one of a first and second operative position, the rod end chambers of respective ones of the first and second actuators are configured to communicate fluid with the drain port to drain the rod end chambers of respective ones of the first and second actuators if the regeneration valve is in a drain position.

In another aspect of this disclosure, a fluid control system is provided for controlling operation of a pair of hydraulic tilt actuators to control movement of a work implement of an earthmoving machine. The fluid control system includes a fluid source, and an electro-hydraulic arrangement that is coupled in selective fluid communication with the pair of actuators and the fluid source. The electro-hydraulic arrangement is configured to selectively communicate fluid between the fluid source and the pair of actuators and between the pair of actuators. The electro-hydraulic arrangement includes a housing, a directional control valve and a regeneration valve that are disposed within the housing. The directional control valve and the regeneration valve are coupled in selective fluid communication with one another. The directional control valve and the regeneration valve are also coupled in selective fluid communication with the pair of actuators via a plurality of ports defined on the housing. At least one first port of the housing communicates fluid between a head end chamber of a first actuator and a first control port of the directional control valve. At least one second port of the housing communicates fluid between a rod end chamber of the first actuator and a second control port of the directional control valve. A third port of the housing communicates fluid between a rod end chamber of a second actuator and a third control port of the directional control valve. A fourth port of the housing communicates fluid between a head end chamber of the second actuator and an output port of the regeneration valve. A drain port of the housing fluidly communicates with a drain control port of the regeneration valve. When the directional control valve is in one of a first and second operative position, the rod end chambers of respective ones of the first and second actuators are configured to communicate fluid with the fourth port to supply fluid to the head end chamber of the second actuator if the regeneration valve is in a regenerative position. Further, when the directional control valve is in one of a first and second operative position, the rod end chambers of respective ones of the first and second actuators are configured to communicate fluid with the drain port to drain the rod end chambers of respective ones of the first and second actuators if the regeneration valve is in a drain position.

In yet another aspect of this disclosure, a method for controlling operation of a pair of hydraulic tilt actuators that are associated with a work implement of an earthmoving machine includes providing a housing having a plurality of ports defined thereon. The method further includes coupling a directional control valve and a regeneration valve in selective fluid communication with one another, via a fluid control line defined in the housing. The method also includes coupling the directional control valve and the regeneration valve in selective fluid communication with the pair of actuators, via the plurality of ports defined on the housing, such that at least one first port of the housing communicates fluid between a head end chamber of a first actuator and a first control port of the directional control valve, at least one second port of the housing communicates fluid between a rod end chamber of the first actuator and a second control port of the directional control valve, a third port of the housing communicates fluid between a rod end chamber of a second actuator and a third control port of the directional control valve, a fourth port of the housing communicates fluid between a head end chamber of the second actuator and an output port of the regeneration valve, and a drain port of the housing fluidly communicates with a drain control port of the regeneration valve. The method further includes actuating movement of the directional control valve into one of a first and second operative position. The method further includes actuating movement of the regeneration valve into a regenerative position to communicate fluid from the rod end chambers of respective ones of the first and second actuators with the fourth port to supply fluid to the head end chamber of the second actuator. Optionally, the method further includes positioning the regeneration valve in a drain position to communicate fluid from the rod end chambers of respective ones of the first and second actuators with the drain port to drain the rod end chambers of respective ones of the first and second actuators.

Other features and aspects of this disclosure will be apparent from the following description and the accompanying drawings.

DETAILED DESCRIPTION

Figure 1:
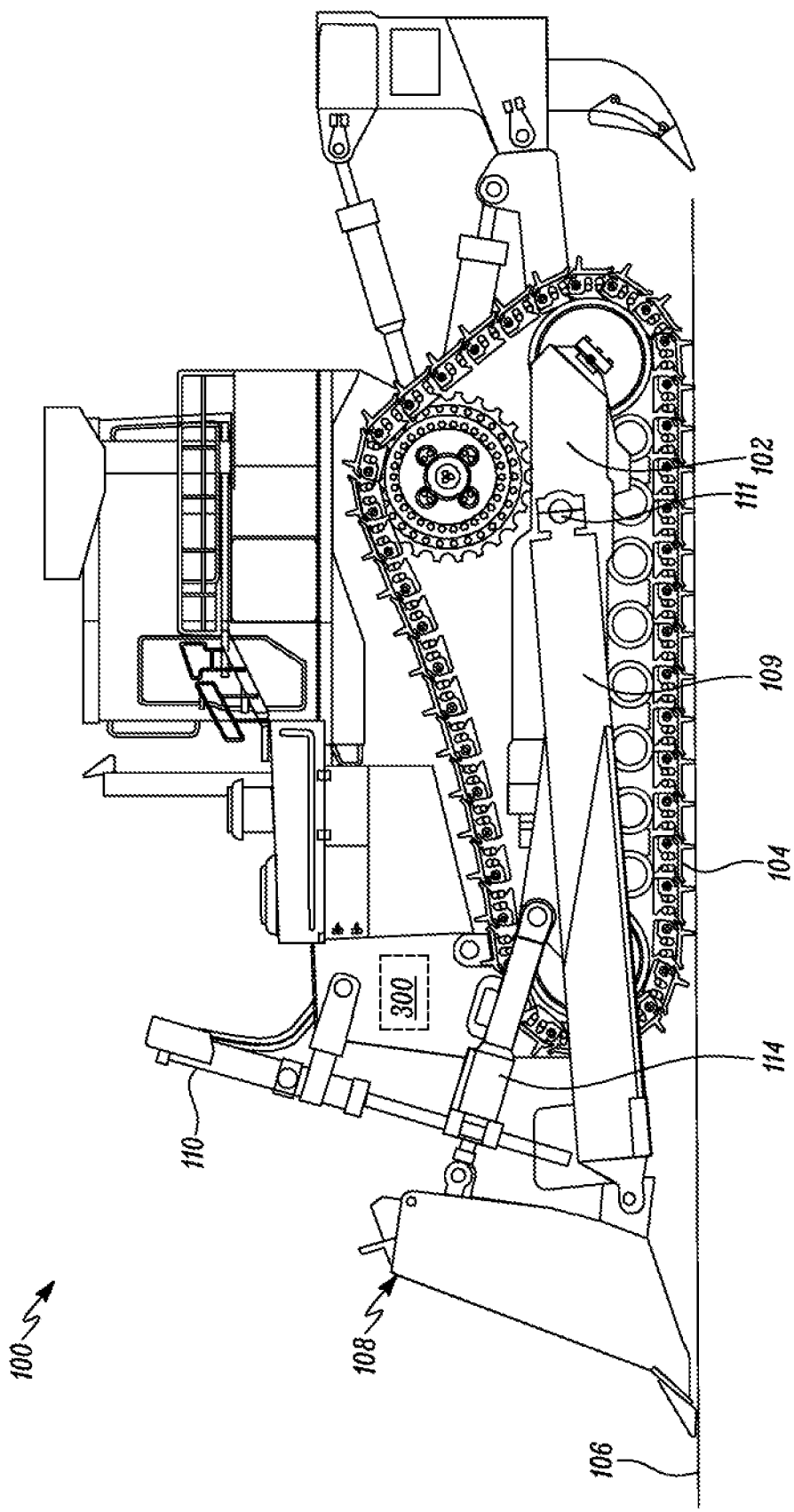
FIG. 1 is a diauammatic view of an exemplary earthmoving machine having a work implement mounted thereon, a pair of hydraulic tilt actuators pivotally coupled to the work implement, and a fluid control system for controlling operation of the pair of tilt actuators, in accordance with an embodiment of the present disclosure.

Reference numerals appearing in more than one figure indicate the same or corresponding parts in each of them. References to elements in the singular may also be construed to relate to the plural and vice-versa without limiting the scope of the disclosure to the exact number or type of such elements unless set forth explicitly in the appended claims.

FIG. 1 illustrates an exemplary earthmoving machine 100, hereinafter referred to as 'the machine 100'. As shown, the machine 100 is embodied as a tractor. However, in other embodiments, the machine 100 may embody other forms or types of earthmoving machines known to persons skilled in the art.

The machine 100 includes a frame 102, and a pair of ground engaging members 104 are rotatably supported on the frame 102. Although, only one ground engaging member 104 is visible in the side view of FIG. 1, a similar ground engaging member is present on the machine 100 and is located distally away from the ground engaging member 104 visible in the view of FIG. 1. The ground engaging members 104 may rotate relative to the frame 102 for propelling the machine 100 on a work surface 106, for example, a mine site. As shown, the pair of ground engaging members 104 may include tracks. However, persons skilled in the art will acknowledge that the present disclosure is not limited to the tracks disclosed herein. Other types of ground engaging members, for example, wheels may be used to form the ground engaging members 104 in lieu of the tracks disclosed herein.

A work implement 108 is moveably supported on the frame 102. As shown, one end of a push arm 109 is coupled to the frame 102 using a pivot joint 111 and another end of the push arm 109 pivotally supports the work implement 108 thereon. As shown in the view of FIG. 1, the work implement 108 is embodied as a carry-dozing blade, and for sake of simplicity, the work implement 108 will hereinafter be referred to as 'the blade 108'. In other embodiments, the work implement 108 may embody a dozing blade in lieu of the carry-dozing blade. The 'dozing blade' disclosed herein may be regarded as any type of blade that is configured to doze material on the work surface 106 without significantly performing a 'carry' function in which a weight of the material laden into/onto the blade would be, otherwise, lifted off from the work surface 106.

With continued reference to FIG. 1 and as shown best in the view of FIG. 2, a pair of hydraulic lift actuators 110, hereinafter referred to as 'lift actuator/s 110', are supported by the frame 102 and connected to a rearwardly facing mid-portion of the blade 108. The lift actuators 110 operably raise or lower the blade 108 in relation to the work surface 106. Further, a pair of hydraulic tilt actuators 112, 114, hereinafter referred to as 'tilt actuator/s 112, 114', are disposed on opposite sides of the machine 100 and located between the push arms 109 and the blade 108 for tilting and/or tipping the blade 108 relative to the frame 102. As best shown in the view of FIG. 3, each tilt actuator 112, 114 has a rod end chamber 116 and a head end chamber 118.

In this application, 'tilting' is the action of moving the blade 108 about a horizontally arranged longitudinal axis XX' substantially perpendicular to the blade 108, whereas 'tipping' is the action of moving the blade 108 about a horizontally arranged transverse axis YY' substantially parallel to the blade 108. Moreover, although one configuration of the lift and tilt actuators 110, 112 and 114 is disclosed herein, it may be noted that embodiments of the present disclosure may be similarly applied to other types of machines in which alternative configurations of the lift and tilt actuators 110, 112 and 114 may be contemplated for use in controlling movement of a corresponding work implement relative to the frame 102.

As shown in FIG. 1, the machine 100 also includes a fluid control system 300 associated with the tilt actuators 112, 114. The fluid control system 300 is provided for controlling operation of the tilt actuators 112, 114 to control movement of the blade 108. As best shown in the schematic of FIG. 3, the fluid control system 300 includes a fluid source 302. The terms 'fluid source 302' may include an implement valve 304, that in one embodiment, may embody a main control valve of the machine 100. The implement valve 304 may be disposed in fluid communication with a pump 306 and a tank 308. The term 'fluid' disclosed herein may be regarded as any type of power transmission fluid, for example, an oil of a specified grade known to persons skilled in the art.

The fluid control system 300 also includes an electro-hydraulic arrangement 310, hereinafter referred to as 'the arrangement 310'. The arrangement 310 is coupled in selective fluid communication with the pair of actuators 112, 114 i.e., the tilt actuators 112, 114 and the fluid source 302. The arrangement 310 is configured to selectively communicate fluid between the fluid source 302 and the pair of actuators and between the pair of actuators. The arrangement 310 includes a housing 312. The arrangement 310 also includes a directional control valve 314 and a regeneration valve 316 that are disposed within the housing 312. In an embodiment as shown, the directional control valve 314 is a spring-biased solenoid-actuated 4-port 3-position spool valve and the regeneration valve 316 is a spring-biased solenoid-actuated 3-port 2-position diverter valve. The directional control valve 314 and the regeneration valve 316 are coupled in selective fluid communication with one another. The directional control valve 314 and the regeneration valve 316 are also coupled in selective fluid communication with the pair of actuators via a plurality of ports defined on the housing 312, explanation to which will be made later herein.

The housing 312 defines at least one first port 318 that communicates fluid, for e.g., oil between the head end chamber 118 of a first actuator i.e., the tilt actuator 112 and a first control port 320 of the directional control valve 314. Further, the housing 312 defines at least one second port 322 that communicates fluid between the rod end chamber 116 of the first actuator 112 and a second control port 324 of the directional control valve 314.

Figure 3:
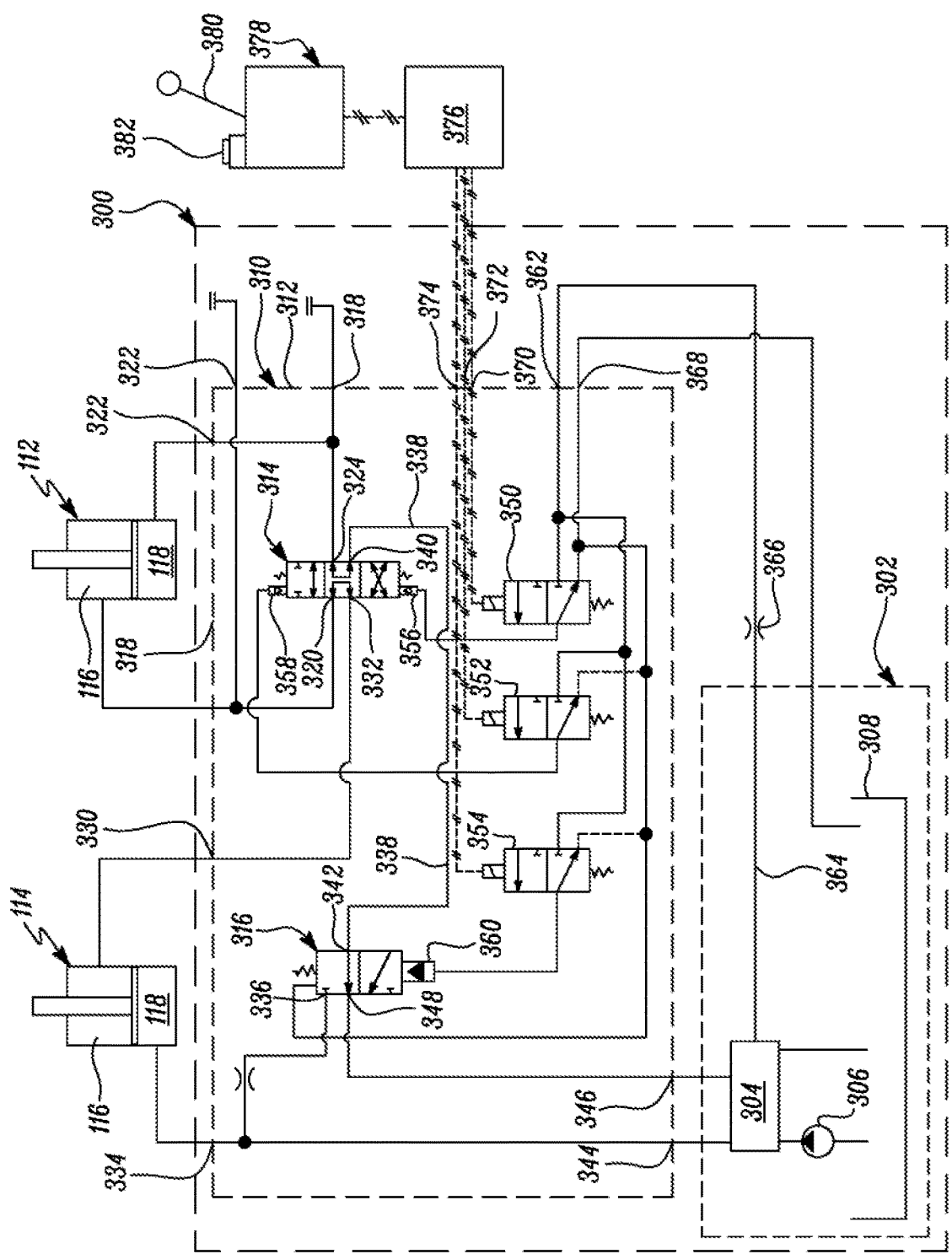
FIG. 3 is a schematic view of the fluid control system showing an electro-hydraulic arrangement and various components of the electro-hydraulic arrangement, in accordance with an embodiment of the present disclosure.
Figure 4:
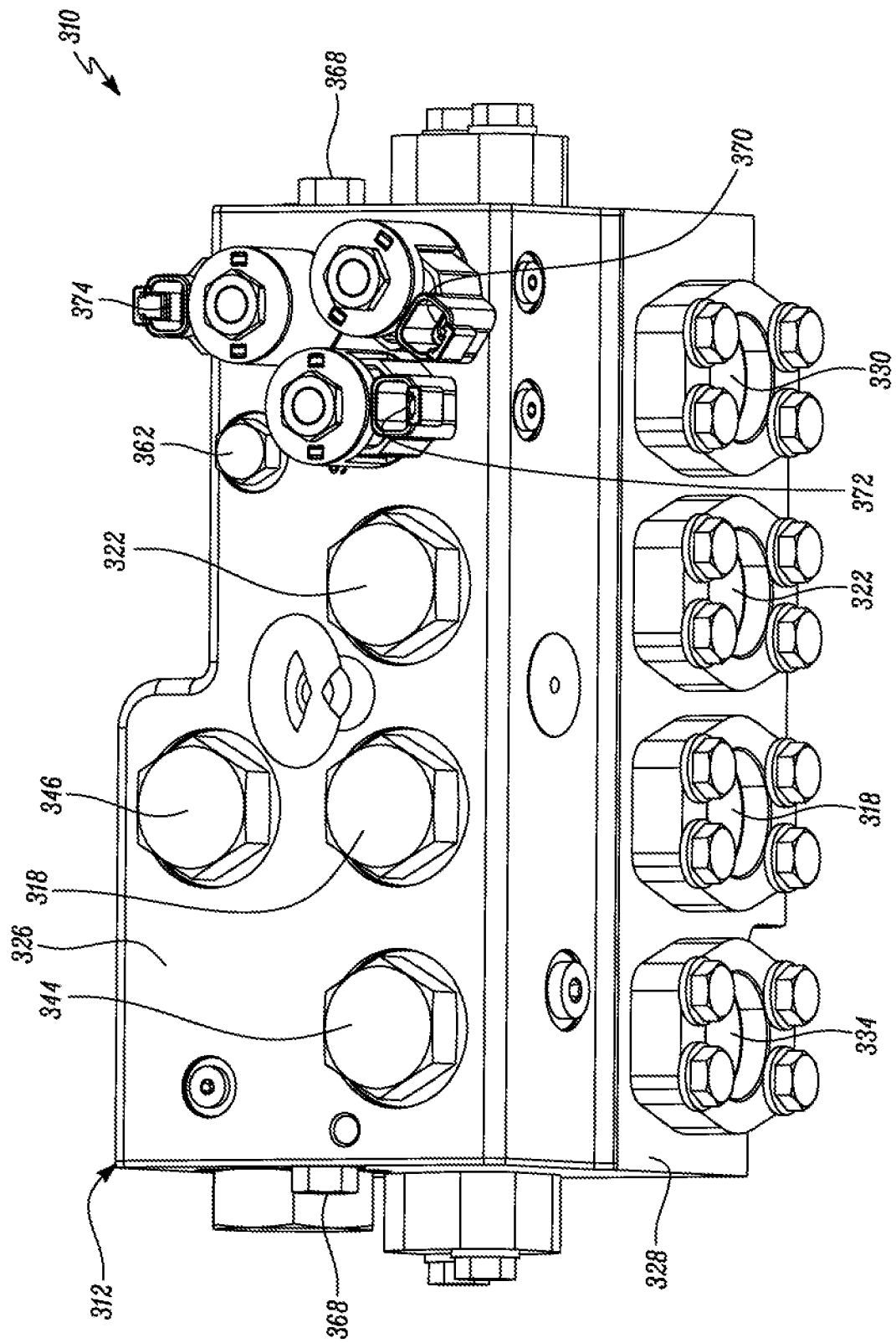
FIG. 4 is a perspective view of an electro-hydraulic arrangement of the fluid control system, in accordance with an embodiment of the present disclosure.

In the illustrated embodiment of FIGS. 3 and 4, the housing 312 defines two first ports 318 and two second ports 322 respectively. It will be appreciated that by positioning each of the two first ports 318 and each of the two second ports 322 on adjacent sidewalls 326, 328 of the housing 312 (refer to FIG. 3), the two first ports 318 and the two second ports 322 can allow users of the arrangement 310 to flexibly use any one of the two first ports 318 and any one of the two second ports 322 to connect with the fluid conduits (not shown in the view of FIG. 4) in communication with the rod end chamber 116 and the head end chamber 118 of one of the tilt actuators, for instance, the tilt actuator 112 as shown.

Further, the housing 312 also defines a third port 330 that communicates fluid between the rod end chamber 116 of a second actuator i.e., the tilt actuator 114 and a third control port 332 of the directional control valve 314. Furthermore, the housing 312 also defines a fourth port 334 that communicates fluid between the head end chamber 118 of the second actuator 114 and an output port 336 of the regeneration valve 316. Furthermore, the housing 312 also defines a fluid control line 338 to communicate fluid from a fourth control port 340 of the directional control valve 314 to an input port 342 of the regeneration valve 316.

Moreover, referring to FIG. 3 and as best shown in the view of FIG. 4, the housing 312 also defines a supply port 344 that is disposed in fluid communication with the fluid source 302 i.e., the implement valve 304. The supply port 344 is configured to communicate fluid between the fluid source 302 and the head end chamber 118 of the second actuator 114 via the fourth port 334 of the housing 312. Further, the housing 312 also defines a drain port 346 that is configured to fluidly communicate the fluid source 302 i.e., the implement valve 304 with a drain control port 348 of the regeneration valve 316.

The arrangement 310 also includes a first solenoid valve 350, a second solenoid valve 352 and a third solenoid valve 354 disposed within the housing 312. The first solenoid valve 350 is coupled in selective fluid communication with a first end actuator 356 of the directional control valve 314. The second solenoid valve 352 is coupled in selective fluid communication with a second end actuator 358 of the directional control valve 314. The third solenoid valve 354 is coupled in selective fluid communication with an end actuator 360 of the regeneration valve 316.

As shown, the housing 312 has a pilot supply port 362 in independent fluid communication with each of the first, second and third solenoid valves 350, 352, 354. The housing 312 may be additionally provided with a pilot supply conduit 364 that is disposed in fluid communication with the pilot supply port 362 via a first orifice 366. Further, the housing 312 may also define at least one pilot discharge port 368 that serves to return actuation fluid from one or more of the first, second and third solenoid valves 350, 352, 354 to the fluid source 302, i.e., the implement valve 304, or the tank 308 as shown, when respective ones of the first, second and third solenoid valves 350, 352, 354 are rendered in a non-operational state. As best shown in the view of FIG. 4, the housing 312 defines two pilot discharge ports 368 provided on the housing 312. The pilot discharge ports 368 may be disposed in fluid communication with each other. Therefore, either, or both, pilot discharge ports 368 may be coupled in fluid communication with the fluid source 302, i.e., the implement valve 304 shown in the schematic of FIG. 3. In other embodiments, fewer or more pilot discharge ports 368 may be defined on the housing 312 of the arrangement 310 based on application requirements as acknowledged by persons skilled in the art.

In the illustrated embodiment of FIG. 4, the actuation fluid, received at the pilot supply port 362 of the housing 312, and the fluid designated as the main working fluid, received at the supply port 344 of the housing 312, are drawn from the same fluid source 302, and may hence, be similar in nature in order to reduce system manufacturing costs, simplify an overall design of the arrangement 310 and its interaction with other hydraulic components of the machine 100. However, in other embodiments, based on specified requirements of an application it can be contemplated to configure the arrangement 310 such that the arrangement 310 may use distinct fluids as the main working fluid and the actuation fluid respectively.

Also, in an embodiment as shown best in the view of FIG. 4, the arrangement 310 also includes a first, second and third terminal 370, 372, 374 disposed, at least partially, within the housing 312. The first, second and third terminals 370, 372, 374 correspond to the first, second and third solenoid valves 350, 352, 354 and are adapted to receive power connections for selectively actuating the first, second and third solenoid valves 350, 352, 354 independently of one another. In embodiments herein, each of the first, second and third solenoid valves 350, 352, 354 may be actuated electrically, and independently of one another, by appropriate command signals issued by a controller 376 based on one or more inputs received from a user-operable control device 378 in communication with the controller 376.

It may be noted that the controller 376 disclosed herein may include various software and/or hardware components that are configured to co-operatively perform functions consistent with the present disclosure. The controller 376 may be a stand-alone controller or may be configured to co-operate with an existing electronic control unit (ECU) (not shown) of the machine 100. Further, the controller 376 may embody a single microprocessor or multiple microprocessors. Numerous commercially available microprocessors can be configured to perform the functions of the controller 376 disclosed herein. It should be appreciated that the controller 376 could readily be embodied in a general machine microprocessor capable of controlling numerous machine functions. The controller 376 may also include a memory and any other components for running an application. Various circuits may be associated with the controller 376 such as power supply circuitry, signal conditioning circuitry, solenoid driver circuitry, and other types of circuitry. Also, various routines, algorithms, and/or programs can be stored at the controller 376 for controlling movement of the blade 108 i.e., for controlling positioning of the blade 108 relative to the frame 102 based, at least in part on, for example, a current position of the blade 108 and/or the lift and tilt actuators 110, 112 and 114 as sensed and output by one or more position sensors (not shown) associated therewith.

Figure 2:
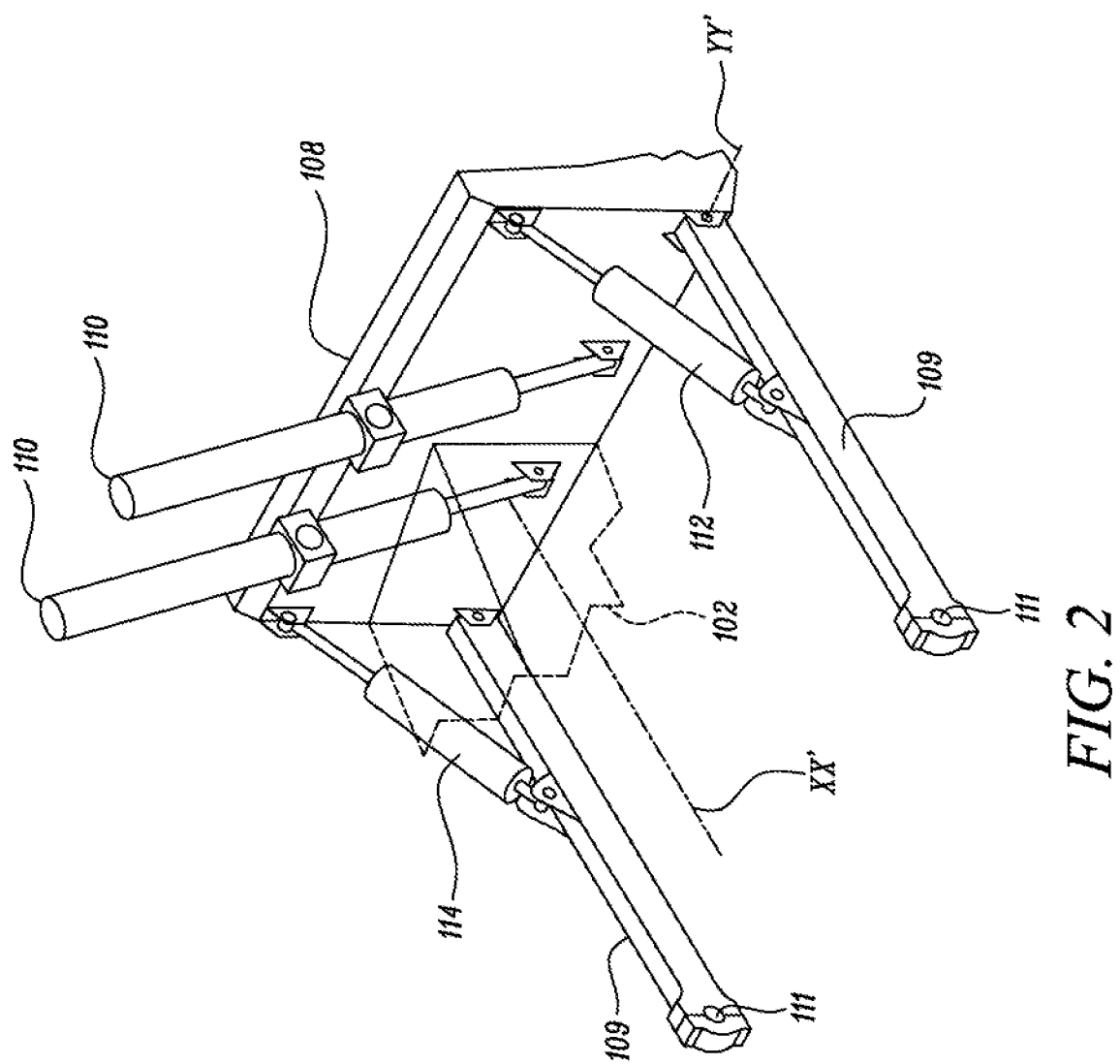
FIG. 2 is a rear elevational perspective view of a representative work implement which is variably positionable by the fluid control system of the present disclosure and further illustrating in fragmentary phantom outline the machine on which the work implement is mounted.

The user-operable control device 378 may include, for example, a lever 380, a switch 382, or any other device/s that is designated for receiving inputs from an operator of the machine 100 in response to which the controller 376 issues appropriate command signals to each of the first, second and third solenoid valves 350, 352, 354 for controlling movement of the blade 108 relative to the longitudinal axis XX' and/or the transverse axis YY' shown in the view of FIG. 2. For instance, in the event that an operator of the machine 100 moves the lever 380 instantaneously or rapidly, or depresses the switch 382 in tandem with, or without, concurrent movement of the lever 380 to a position that commands a 'faster-than-usual' tilt speed and/or tip speed of the blade 108, the controller 376 commands the third solenoid valve 354 to allow actuate movement of the regeneration valve 316 into its regenerative position in which fluid, from the rod end chambers 116 of either one or both of the tilt actuators 112, 114, if present in the fluid control line 338 may be routed to the head end chamber 118 of one of the actuators, for instance, the actuator 114 via the output port 336 of the regeneration valve 316 to recombine with fluid flow from the implement valve 304 via the supply port 344 at the fourth port 334 of the housing 312. This recombination of fluids at the fourth port 334 of the housing 312 causes the head end chamber 118 of the actuator 114, and optionally the head end chamber 118 of the actuator 112, to expand at a speed that is 'faster-than-usual' resulting in 'faster-than-usual' tilt and/or tip speeds of the blade 108 relative to the frame 102 when tilting or tipping movements of the blade 108 are needed to be carried out by the machine 100. Moreover, the recombination of fluids may entail a decrease in the amount of flow needed from the pump 306 to 'rapidly' tilt or tip the blade 108. Consequently, it is envisioned that with operation of the regeneration valve 316, the pump 306 may have an improved i.e., an extended or prolonged service life.

In embodiments herein, when the directional control valve 314 is in one of a first and second operative position and if the regeneration valve 316 is in a regenerative position, the rod end chambers 116 of respective ones of the first and second actuators 112, 114 are configured to communicate fluid with the fourth port 334 of the housing 312 for supplying fluid to the head end chamber 118 of the second actuator 114.

In a first mode of operation, upon actuation of the first and third solenoid valves 350, 354, fluid flow via the pilot supply port 362 of the housing 312 is configured to actuate movement of each of the directional control valve 314 and the regeneration valve 316 upwards i.e., into a second operative position and the regenerative position respectively. When the directional control valve 314 and the regeneration valve 316 are in the second operative position and the regenerative position respectively, the rod end chamber 116 of the second actuator 114 communicates fluid with the head end chamber 118 of the first actuator 112, via the third and second control ports 332, 324 of the directional control valve 314. Also, the rod end chamber 116 of the first actuator 112 communicates fluid with the head end chamber 118 of the second actuator 114, via the first and fourth control ports 320, 340 of the directional control valve 314, and via the input and output ports 342, 336 of the regeneration valve 316. In this manner, fluid from respective ones of the fluid control line 338 and the supply port 344 combines at the fourth port 334 of the housing 312 to cause rapid extension of the head end chamber 118 of the second actuator 114 and in response to which the head end chamber 118 of the first actuator 112 also rapidly extends in a coterminous manner with the fluid expelled from the rod end chamber 116 of the second actuator 114 routed to the head end chamber 118 of the first actuator 112 via the third and second control ports 332, 324 of the directional control valve 314.

This first mode of operation in which the first and third solenoid valves 350, 354 are commanded, or energized, to actuate movement of the directional control valve 314 and the regeneration valve 316 into the second operative position and the regenerative position respectively and in response to which the tilt actuators 112, 114 'rapidly' extend in length for tipping the blade 108 over the horizontally arranged transverse axis YY' (refer to FIG. 2) may be regarded as a 'rapid pitch mode' that may be advantageously used by an operator of the machine 100 during a quick dump event to jerk out any material that has been dozed by, or laden on, the blade 108.

In a second mode of operation, upon actuation of the second and third solenoid valves 352, 354, fluid flow via the pilot supply port 362 of the housing 312 is configured to actuate movement of the directional control valve 314 downwards i.e., into a first operative position and the regeneration valve 316 upwards i.e., into the regenerative position. When the directional control valve 314 and the regeneration valve 316 are in the first operative position and the regenerative position respectively, the rod end chamber 116 of the second actuator 114 communicates fluid with the head end chamber 118 of the second actuator 114 via the third and fourth control ports 332, 340 of the directional control valve 314 and via the input and output ports 342, 336 of the regeneration valve 316. Further, when the directional control valve 314 is in the first operative position, the directional control valve 314 is also configured to prevent fluid flow between the first and second control ports 320, 324 so as to prevent communication between the rod end and head end chambers 116, 118 of the first actuator 112. As a result, the first actuator 112 remains stationary in its current position while the second actuator 114 extends 'rapidly' to tilt the blade 108 at a speed 'faster-than-usual' about the horizontally arranged longitudinal axis XX'. For purposes of the present disclosure, the second mode of operation disclosed herein may be regarded as 'the rapid tilt mode'.

Further, in alternative embodiments herein, when the directional control valve 314 is in one of a first and second operative position and the regeneration valve 316 is in a drain position i.e., the third solenoid is not energized by the controller 376, the rod end chambers 116 of respective ones of the first and second actuators 112, 114 are configured to communicate fluid with the drain port 346 of the housing 312 to drain the rod end chambers 116 of respective ones of the first and second actuators 112, 114 to the fluid source 302 i.e., the implement valve 304 or the tank 308 depending on specific requirements of an application.

Figure 5:
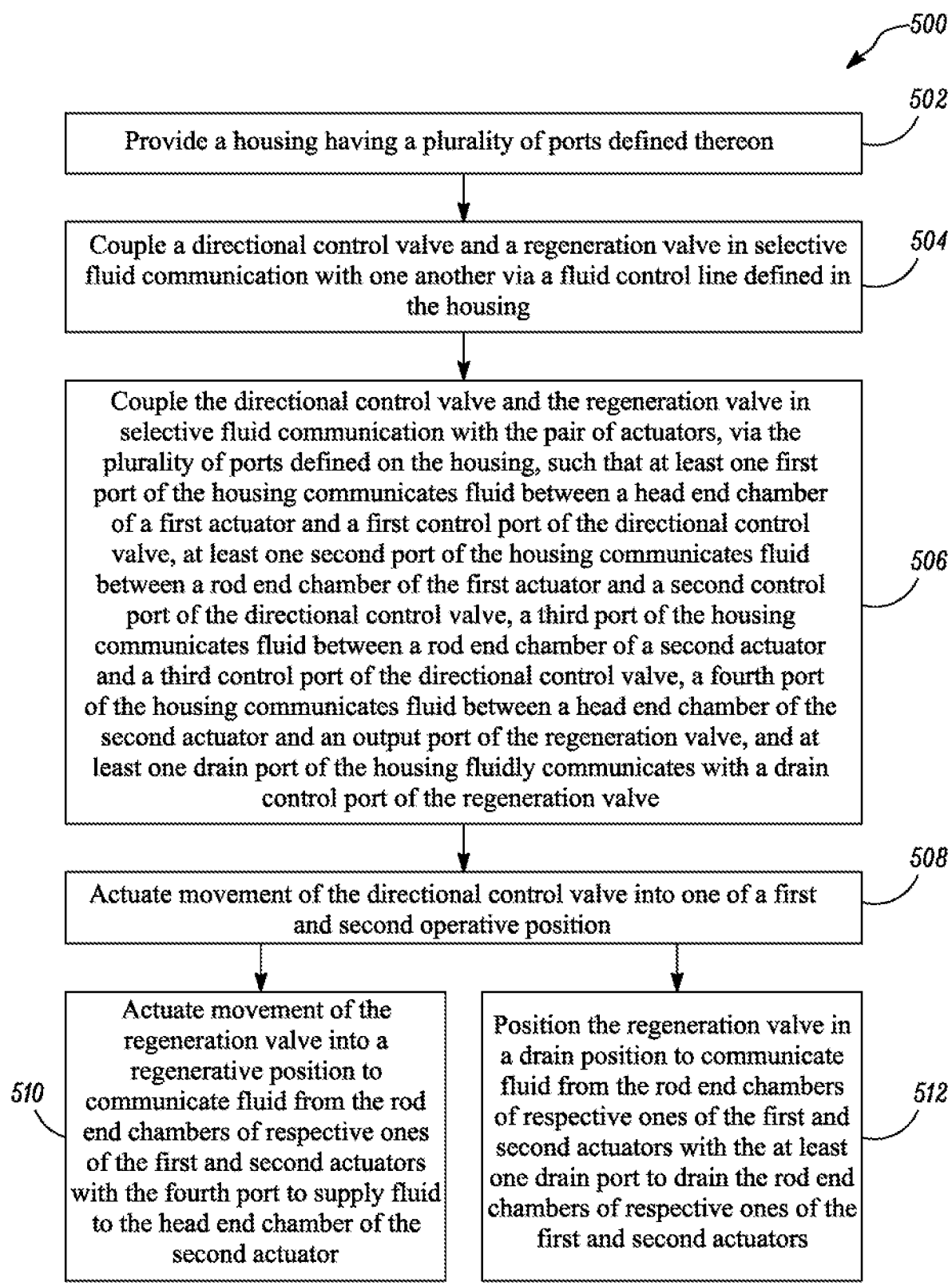
FIG. 5 is a flowchart depicting steps of a method for controlling an operation of the pair of hydraulic tilt actuators that are associated with the work implement of the earthmoving machine, in accordance with an embodiment of the present disclosure.

FIG. 5 illustrates a method 500 for controlling an operation of the pair of tilt actuators 112, 114 associated with the blade 108 of the machine 100. As shown at step 502 of FIG. 5, the method includes providing the housing 312 having the plurality of ports defined thereon. In an example as shown in FIG. 4, the housing 312 having the first, second, third and fourth ports 318, 322, 330, 334 besides the supply port 344, the drain port 346, the pilot supply port 362, and the pilot discharge port 368.

At step 504, the method 500 further includes coupling the directional control valve 314 and the regeneration valve 316 in selective fluid communication with one another, via the fluid control line 338 defined in the housing 312. As shown best in the view of FIG. 3, the fluid control line 338 is defined in the housing 312 to communicate fluid between the fourth control port 340 of the directional control valve 314 and the input port 342 of the regeneration valve 316.

At step 506, the method 500 also includes coupling the directional control valve 314 and the regeneration valve 316 in selective fluid communication with the pair of actuators i.e., the tilt actuators 112, 114, via the plurality of ports defined on the housing 312 such that at least one first port 318 of the housing 312 communicates fluid between the head end chamber 118 of the first actuator 112 and the first control port 320 of the directional control valve 314, at least one second port 322 of the housing 312 communicates fluid between the rod end chamber 116 of the first actuator 112 and the second control port 324 of the directional control valve 314, the third port 330 of the housing 312 communicates fluid between the rod end chamber 116 of the second actuator 114 and the third control port 332 of the directional control valve 314, the fourth port 334 of the housing 312 communicates fluid between the head end chamber 118 of the second actuator 114 and the output port 336 of the regeneration valve 316, and the drain port 346 of the housing 312 fluidly communicates with the drain control port 348 of the regeneration valve 316.

At step 508, the method 500 further includes actuating movement of the directional control valve 314 into one of the first and second operative positions. At step 510, the method 500 further includes actuating movement of the regeneration valve 316 into its regenerative position to communicate fluid from the rod end chambers 116 of respective ones of the first and second actuators 112, 114 with the fourth port 334 to supply fluid to the head end chamber 118 of the second actuator 114.

Optionally, as shown at step 512, the method 500 further includes positioning the regeneration valve 316 in the drain position to communicate fluid from the rod end chambers 116 of respective ones of the first and second actuators 112, 114 with the drain port 346 of the arrangement 310 to drain the rod end chambers 116 of respective ones of the first and second actuators 112, 114.

Additionally, in embodiments herein, the method 500 also includes positioning the first solenoid valve 350, the second solenoid valve 352 and the third solenoid valve 354 within the housing 312. Moreover, the method 500 would also include coupling the first solenoid valve 350 in selective fluid communication with the first end actuator 356 of the directional control valve 314. Further, the method 500 would also include coupling the second solenoid valve 352 in selective fluid communication with the second end actuator 358 of the directional control valve 314. Furthermore, the method 500 would also include coupling the third solenoid valve 354 in selective fluid communication with the end actuator 360 of the regeneration valve 316.

Various embodiments disclosed herein are to be taken in the illustrative and explanatory sense and should in no way be construed as limiting of the present disclosure. All joinder references (e.g., associated, provided, connected, coupled and the like) and directional references (e.g., upwards, downwards, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", or any other ordinary and/or numerical terms, should also be taken only as identifiers, to assist the reader's understanding of the various elements of the present disclosure, and may not create any limitations, particularly as to the order, or preference, of any element relative to or over another element.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

With implementation of the embodiments disclosed herein, manufacturers of earthmoving machines can easily install a fluid control system for controlling operation of a pair of hydraulic actuators. The arrangement of the present disclosure is imparted with a fluid regeneration functionality that can help operators to accomplish a 'rapid tilt mode' and a 'rapid pitch mode' of operation for a work implement of the machine.

As a single housing houses a directional control valve, a regeneration valve, a first solenoid, a second solenoid, a third solenoid, and the first, second and third terminals, the housing serves to integrate an assembly of the afore-mentioned components therein besides rendering the arrangement as a unitary component, of compact size, for use on a machine. The compact size of the arrangement may require a far lesser amount of space on the machine for installation as compared to traditional fluid control systems or setups in which multiple valves and/or manifolds are rendered independently of one another and individually connected to form the traditional fluid control system.

The housing may be formed using metals, for example, ductile iron, brass, or a thermoplastic polymer, for example, High-density polyethylene (HDPE). The housing of the arrangement may be produced using commonly known processes including, but not limited to, die-casting, machining, additive manufacturing or other known to persons skilled in the art. Therefore, a manufacture of the housing may be accomplished easily, quickly, and in a cost-effective manner. By using the housing to enclose the assembly of aforementioned components disclosed herein, the housing may also help prevent deterioration of such components when operating in extreme or harsh environments. Thus, the arrangement of the present disclosure also helps to reduce downtimes previously associated with the machine, owing to frequent maintenance, repair or replacement of traditionally known fluid control setups exposed to similar working environments.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof

What is claimed is:

1. An electro-hydraulic arrangement for controlling operation of a pair of hydraulic tilt actuators associated with a work implement of an earthmoving machine, the arrangement comprising:
    a housing;
    a directional control valve and a regeneration valve disposed within the housing and coupled in selective fluid communication with one another and the pair of actuators via a plurality of ports defined on the housing such that:
        at least one first port of the housing communicates fluid between a head end chamber of a first actuator and a first control port of the directional control valve,
        at least one second port of the housing communicates fluid between a rod end chamber of the first actuator and a second control port of the directional control valve,
        a third port of the housing communicates fluid between a rod end chamber of a second actuator and a third control port of the directional control valve,
        a fourth port of the housing communicates fluid between a head end chamber of the second actuator and an output port of the regeneration valve, and
        a drain port of the housing fluidly communicates with a drain control port of the regeneration valve, wherein when the directional control valve is in one of a first and second operative position, the rod end chambers of respective ones of the first and second actuators are configured to communicate fluid with:
            the fourth port to supply fluid to the head end chamber of the second actuator if the regeneration valve is in a regenerative position, and
            the drain port to drain the rod end chambers of respective ones of the first and second actuators if the regeneration valve is in a drain position.

2. The electro-hydraulic arrangement of claim 1, wherein the housing is configured to further define a fluid control line to communicate fluid from a fourth control port of the directional control valve to an input port of the regeneration valve.

3. The electro-hydraulic arrangement of claim 2, wherein the directional control valve is a spring-biased solenoid-actuated 4-port 3-position spool valve and the regenerative valve is a spring-biased solenoid-actuated 3-port 2-position diverter valve.

4. The electro-hydraulic arrangement of claim 3 further comprising:
    a first solenoid valve disposed within the housing and coupled in selective fluid communication with a first end actuator of the directional control valve;
    a second solenoid valve disposed within the housing and coupled in selective fluid communication with a second end actuator of the directional control valve; and
    a third solenoid valve disposed within the housing and coupled in selective fluid communication with an end actuator of the regeneration valve.

5. The electro-hydraulic arrangement of claim 4, wherein the housing has a pilot supply port in independent fluid communication with each of the first, second, and third solenoid valves.

6. The electro-hydraulic arrangement of claim 5, wherein upon actuation of the first and third solenoid valves, fluid flow via the pilot supply port of the housing is configured to actuate movement of the directional control valve and the regenerative valve into the second operative position and the regenerative position respectively so that:
    the rod end chamber of the second actuator communicates fluid with the head end chamber of the first actuator via the third and second control ports of the directional control valve, and
    the rod end chamber of the first actuator communicates fluid with the head end chamber of the second actuator via the first and fourth control ports of the directional control valve and via the input and output ports of the regeneration valve.

7. The electro-hydraulic arrangement of claim 5, wherein upon actuation of the second and third solenoid valves, fluid flow via the pilot supply port of the housing is configured to actuate movement of the directional control valve and the regenerative valve into the first operative position and the regenerative position respectively so that the rod end chamber of the second actuator communicates fluid with the head end chamber of the second actuator via the third and fourth control ports of the directional control valve and via the input and output ports of the regeneration valve.

8. The electro-hydraulic arrangement of claim 7, wherein upon moving the directional control valve into its first operative position by the second solenoid valve, the directional control valve prevents fluid flow between the first and second control ports so as to prevent communication between the rod end and head end chambers of the first actuator.

9. The electro-hydraulic arrangement of claim 3 further comprising a first, second and third terminal disposed, at least partially, within the housing, the first, second and third terminal corresponding to the first, second and third solenoid valves and adapted to receive power connections for selectively actuating the first, second and third solenoid valves independently of one another.

10. A fluid control system for controlling operation of a pair of hydraulic tilt actuators to control movement of a work implement of an earthmoving machine, the fluid control system comprising:
    a fluid source; and
    an electro-hydraulic arrangement coupled in selective fluid communication with the pair of actuators and the fluid source, the electro-hydraulic arrangement configured to selectively communicate fluid between the fluid source and the pair of actuators and between the pair of actuators, the electro-hydraulic arrangement comprising:
        a housing;
        a directional control valve and a regeneration valve disposed within the housing and coupled in selective fluid communication with one another and the pair of actuators via a plurality of ports defined on the housing such that:
            at least one first port of the housing communicates fluid between a head end chamber of a first actuator and a first control port of the directional control valve, at least one second port of the housing communicates fluid between a rod end chamber of the first actuator and a second control port of the directional control valve, a third port of the housing communicates fluid between a rod end chamber of a second actuator and a third control port of the directional control valve, a fourth port of the housing communicates fluid between a head end chamber of the second actuator and an output port of the regeneration valve, and a drain port of the housing fluidly communicates with a drain control port of the regeneration valve, wherein when the directional control valve is in one of a first and second operative position, the rod end chambers of respective ones of the first and second actuators are configured to communicate fluid with:

the fourth port to supply fluid to the head end chamber of the second actuator if the regeneration valve is in a regenerative position, and the drain port to drain the rod end chambers of respective ones of the first and second actuators if regeneration valve is in a drain position.

11. The fluid control system of claim 10, wherein the housing is configured to further define a fluid control line to communicate fluid from a fourth control port of the directional control valve to an input port of the regeneration valve.

12. The fluid control system of claim 11, wherein the directional control valve is a spring-biased solenoid-actuated 4-port 3-position spool valve and the regenerative valve is a spring-biased solenoid-actuated 3-port 2-position diverter valve.

13. The fluid control system of claim 12, wherein the electro-hydraulic arrangement further comprises:

a first solenoid valve disposed within the housing and coupled in selective fluid communication with a first end actuator of the directional control valve;

a second solenoid valve disposed within the housing and coupled in selective fluid communication with a second end actuator of the directional control valve; and a third solenoid valve disposed within the housing and coupled in selective fluid communication with an end actuator of the regeneration valve.

14. The fluid control system of claim 13, wherein the housing has a pilot supply port in independent fluid communication with each of the first, second, and third solenoid valves.

15. The fluid control system of claim 14, wherein upon actuation of the first and third solenoid valves, fluid flow via the pilot supply port of the housing is configured to actuate movement of the directional control valve and the regenerative valve into the second operative position and the regenerative position respectively so that:

the rod end chamber of the second actuator communicates fluid with the head end chamber of the first actuator via the third and second control ports of the directional control valve, and the rod end chamber of the first actuator communicates fluid with the head end chamber of the second actuator via the first and fourth control ports of the directional control valve and via the input and output ports of the regeneration valve.

16. The fluid control system of claim 14, wherein upon actuation of the second and third solenoid valves, fluid flow via the pilot supply port of the housing is configured to actuate movement of the directional control valve and the regenerative valve into the first operative position and the regenerative position respectively so that the rod end chamber of the second actuator communicates fluid with the head end chamber of the second actuator via the third and fourth control ports of the directional control valve and via the input and output ports of the regeneration valve.

17. The fluid control system of claim 16, wherein upon moving the directional control valve into its first operative position by the second solenoid valve, the directional control valve prevents fluid flow between the first and second control ports so as to prevent communication between the rod end and head end chambers of the first actuator.

18. The fluid control system of claim 13, wherein the electro-hydraulic arrangement further comprises a first, second and third terminal disposed, at least partially, within the housing, the first, second and third terminal corresponding to the first, second and third solenoid valves and adapted to receive power connections for actuating the first, second and third solenoid valves independently of one another.

19. A method for controlling an operation of a pair of hydraulic tilt actuators associated with a work implement of an earthmoving machine, the method comprising:

providing a housing having a plurality of ports defined thereon;

coupling a directional control valve and a regeneration valve in selective fluid communication with one another, via a fluid control line defined in the housing, and the pair of actuators, via the plurality of ports defined on the housing, such that:

at least one first port of the housing communicates fluid between a head end chamber of a first actuator and a first control port of the directional control valve, at least one second port of the housing communicates fluid between a rod end chamber of the first actuator and a second control port of the directional control valve, a third port of the housing communicates fluid between a rod end chamber of a second actuator and a third control port of the directional control valve, a fourth port of the housing communicates fluid between a head end chamber of the second actuator and an output port of the regeneration valve, and a drain port of the housing fluidly communicates with a drain control port of the regeneration valve;

actuating movement of the directional control valve into one of a first and second operative position, and actuating movement of the regeneration valve into a regenerative position to communicate fluid from the rod end chambers of respective ones of the first and second actuators with the fourth port to supply fluid to the head end chamber of the second actuator, and positioning the regeneration valve in a drain position to communicate fluid from the rod end chambers of respective ones of the first and second actuators with the drain port to drain the rod end chambers of respective ones of the first and second actuators.

20. The method of claim 19 further comprising:

positioning a first solenoid valve, a second solenoid valve and a third solenoid valve within the housing;

coupling the first solenoid valve in selective fluid communication with a first end actuator of the directional control valve;

coupling the second solenoid valve in selective fluid communication with a second end actuator of the directional control valve; and coupling the third solenoid valve in selective fluid communication with an end actuator of the regeneration valve.

\* \* \* \* \*